US012645520B2

(12) United States Patent
    Jannusch et al.

(10) Patent No.: US 12,645,520 B2
(45) Date of Patent: Jun. 2, 2026

(54) MEMORY WITH FAIL INDICATORS, INCLUDING MEMORY WITH LED FAIL INDICATORS, AND ASSOCIATED SYSTEMS, DEVICES, AND METHODS

(71) Applicant: Micron Technology, Inc., Boise, ID (US)

(72) Inventors: Aaron Jannusch, Boise, ID (US); Mow Yiak Goh, Boise, ID (US); Robin K. Mitra, Buda, TX (US)

(73) Assignee: Micron Technology, Inc., Boise, ID (US)

( * ) Notice: Subject to any disclaimer, the term of this patent is extended or adjusted under 35 U.S.C. 154(b) by 80 days.

(21) Appl. No.: 18/223,465

(22) Filed: Jul. 18, 2023

(65) Prior Publication Data

US 2024/0070007 A1     Feb. 29, 2024

Related U.S. Application Data

(60) Provisional application No. 63/402,748, filed on Aug. 31, 2022.

(51) Int. Cl.
    G06F 11/07          (2006.01)
(52) U.S. Cl.
    CPC ................................. G06F 11/0772 (2013.01)
(58) Field of Classification Search
    CPC ............. G06F 11/0772; G06F 11/0766; G06F 11/0769
    See application file for complete search history.

(56) References Cited

U.S. PATENT DOCUMENTS

| | | | | |
|---|---|---|---|---|
| 5,774,647 A * | 6/1998 | Raynham | ............... | G11C 29/44 714/48 |
| 11,561,697 B2 * | 1/2023 | Nguyen | .................. | G06F 3/064 |
| 11,636,014 B2 * | 4/2023 | Shim | ...................... | G11C 29/08 714/100 |

(Continued)

OTHER PUBLICATIONS

SPD General Standard. Datasheet [online]. JEDEC, 2008. Retrieved from the Internet: <URL: https://www.jedec.org/system/files/docs/4_01_02R19.pdf> (Year: 2008).*

(Continued)

*Primary Examiner* — Joseph O Schell
*Assistant Examiner* — Bryan P Huang
(74) *Attorney, Agent, or Firm* — Dorsey & Whitney LLP

(57)          ABSTRACT

Memory with fail indicators, and associated systems, devices, and methods are disclosed herein. In one embodiment, a system includes a plurality of memory systems and a host device. At least one of the memory systems includes a fail indicator connected to the host device via a side channel of the system. The host device is configured to detect an occurrence of a failure on the at least one memory system and to initiate activation of the fail indicator. The side channel can be an I2C or I3C® side channel. The fail indicator, when activated, can provide a visual indication of the failure. For example, the fail indicator can include an LED that can be activated to emit light and provide an indication of the failure. A color of the light can correspond to a type, occurrence, or location of the failure on the at least one memory system.

20 Claims, 5 Drawing Sheets

(56) References Cited

U.S. PATENT DOCUMENTS

| | | | |
|---|---|---|---|
| 2011/0153903 A1* | 6/2011 | Hinkle | G06F 13/1684 |
| | | | 710/313 |
| 2014/0192583 A1* | 7/2014 | Rajan | G11C 7/10 |
| | | | 365/63 |
| 2016/0055058 A1* | 2/2016 | Zheng | G06F 11/10 |
| | | | 714/764 |
| 2017/0161136 A1* | 6/2017 | Han | G06F 11/326 |

OTHER PUBLICATIONS

Micro-Star Int'l Co., Ltd. AMD X570 series BIOS AMD B550 series BIOS User Guide [online], Jan. 2022. Retrieved from the Internet:<URL:https://download.msi.com/archive/mnu_exe/mb/AMDX570BIOS.pdf> (Year: 2022).*

Wikipedia, I3C (bus) [online], Aug. 29, 2022. Retrieved from the Internet: <URL: https://en.wikipedia.org/w/index.php?title=I3C_(bus)&oldid=1107376302#History> (Year: 2022).*

* cited by examiner

MEMORY WITH FAIL INDICATORS, INCLUDING MEMORY WITH LED FAIL INDICATORS, AND ASSOCIATED SYSTEMS, DEVICES, AND METHODS

CROSS-REFERENCE TO RELATED APPLICATION(S)

The present application claims priority to U.S. Provisional Patent Application No. 63/402,748, filed Aug. 31, 2022, the disclosure of which is incorporated herein by reference in its entirety.

TECHNICAL FIELD

The present disclosure is related to memory systems, devices, and associated methods. For example, several embodiments of the present disclosure are directed to memory systems with fail indicators, such as memory systems that include LEDs that can be activated to visibly indicate the occurrence, type, and/or location of an error or failure.

BACKGROUND

Memory devices are widely used to store information related to various electronic devices such as computers, wireless communication devices, cameras, digital displays, and the like. Memory devices are frequently provided as internal, integrated circuits and/or as part of external removable devices in computers or other electronic devices. There are many different types of memory, including volatile and non-volatile memory. Volatile memory, including static random-access memory (SRAM), dynamic random-access memory (DRAM), and synchronous dynamic random-access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), ferroelectric random-access memory (FeRAM), resistive random-access memory (RRAM), and magnetic random-access memory (MRAM), among others. Improving memory devices, generally, may include increasing memory cell density, increasing performance (e.g., read, write, erase speeds) or otherwise reducing operational latency, increasing reliability, increasing data retention, reducing power consumption, reducing manufacturing costs, or reducing dimensional attributes, among other metrics.

BRIEF DESCRIPTION OF THE DRAWINGS

The present disclosure will be understood more fully from the detailed description given below and from the accompanying drawings of various embodiments of the present disclosure. The components in the drawings are not necessarily to scale. Instead, emphasis is placed on illustrating clearly the principles of the present technology. The drawings should not be taken to limit the disclosure to the specific embodiments depicted, but are for explanation and understanding only.

DETAILED DESCRIPTION

Figure 1:
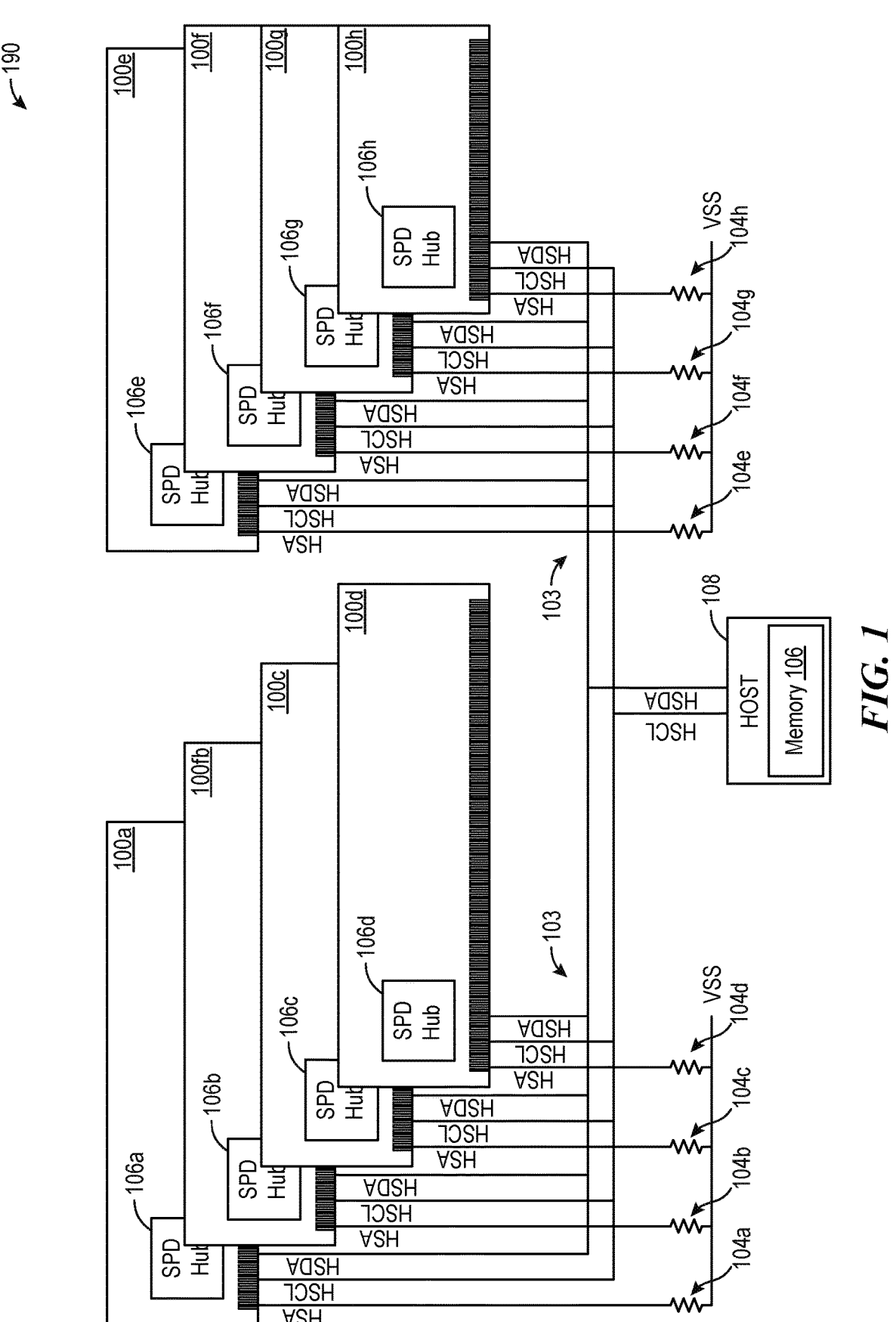
FIG. 1 is a block diagram schematically illustrating a system incorporating a plurality of memory systems and configured in accordance with various embodiments of the present technology.

Serial presence detect (SPD) is a standardized protocol for storing and communicating operational information regarding a memory system or device, such as a dual in-line memory module (DIMM). Examples of SPD information include module size, data width, data speed, timing specifications, operating conditions, and the like. SPD information is commonly stored at standardized locations (e.g., in defined bytes of memory) in an SPD hub of a memory system and can be read out to a basic input/output system (BIOS), for example, at boot or startup. Several of these standardized locations are reserved for storing SPD information relating to errors or failures ("failures") that occur in the memory system. Examples of failure information that can be stored as SPD information can include indications of whether a failure has occurred, indications of types of failures that have occurred, indications of locations (e.g., specific DRAM dies, specific memory bank groups, specific memory banks, etc.) of where failures have occurred in the memory system, and the like.

SPD information relating to failures typically requires system-level (e.g., BIOS-level) software to decode the failure information. Therefore, system administrators are often reliant on the system reporting a failure whenever the SPD information is read out from the SPD hub. Not all systems are configured to externally report failures of memory systems, however, and those that are commonly do not report a specific location or a specific memory system of where the failures occurred. Thus, system administrators must often use software support systems and reverse engineering to identify a failing memory system (e.g., a failing DIMM), memory device (e.g., DRAM die), memory bank group, memory bank, etc. before the failing component can be serviced and/or replaced. Such a procedure is relatively slow and costly.

To address these concerns, the present technology is directed to memory systems with fail indicators that are configured to provide an indication of when failures are detected on the memory systems. For example, a memory system of the present technology can include a fail indicator connected to a host device via a side channel of the memory system. The side channel can be an I2C or I3C® side channel in some embodiments. Additionally, or alternatively, the fail indicator can include a light emitting diode (LED) or other light source, or an external terminal of the memory system (e.g., separate from the side channel). In some embodiments, when the host device or a BIOS reads out (via the side channel) SPD information or other information relating to a failure that occurred on the memory system, the host device of the BIOS can detect the failure and/or determine a type or location of the failure on the memory system. In turn, the host device or the BIOS can activate the fail indicator on the memory system. For example, the host device or the BIOS can instruct the fail indicator to switch from a first state to a second state. In embodiments in which the fail indicator includes an LED or other light source, the host device of the BIOS can instruct the fail indicator to switch from 'off' (not emitting light) to 'on' (emitting light). Continuing with this example, the color and/or other properties of the light (e.g., light duration, duty cycle, brightness, etc.) emitted from the LED or other light source can correspond to the occurrence, type, and/or location of the failure identified on the memory system. Additionally, or alternatively, the specific LED or light source activated of a plurality of LEDs or light sources on the memory system can correspond to the occurrence, type, and/or location of the failure identified on the memory system.

In this manner, the present technology can provide an indication (e.g., a visual indication) to a system administrator or technician that a failure has occurred on the memory system. In turn, the system administrator/technician can quickly locate a failing memory system and/or component of a memory system for service or replacement (e.g., regardless of whether system-level software to decode failure information is currently available to the system administrator/technician). Therefore, the present technology is expected to increase the speed with which failing memory systems and/or components are serviced and/or replaced. In other words, the present technology is expected to speed up the failure detection and resolution processes, such as during manufacturing of the memory systems and/or during operation of the memory systems within a server farm or other application.

In the illustrated embodiments below, the memory devices and systems are primarily described in the context of systems incorporating dual in-line memory modules (DIMMs), each having a plurality of dynamic rand-access memory (DRAM) devices. Systems configured in accordance with other embodiments of the present technology, however, can include other types of memory systems and devices incorporating other types of storage media, including PCM, SRAM, FRAM, RRAM, MRAM, read only memory (ROM), erasable programmable ROM (EPROM), electrically erasable programmable ROM (EEROM), ferroelectric, magnetoresistive, and other storage media, including non-volatile (e.g., flash, NAND and/or NOR) storage media. A person skilled in the art will understand that the technology may have additional embodiments and that the technology may be practiced without several of the details of the embodiments described below with reference to FIGS. 1-7.

FIG. 1 is a block diagram schematically illustrating a system 190 configured in accordance with various embodiments of the present technology. In the illustrated embodiment, the system 190 includes a plurality of memory systems 100 (identified individually as memory systems 100a-100h) connected to a host device 108. Other well-known components of the system 190 have been omitted from FIG. 1 and are not described in detail below so as to avoid unnecessarily obscuring aspects of the present technology.

In some embodiments, the memory systems 100 can be dual in-line memory modules (DIMMs) or one or more other types of memory systems. As discussed in greater detail below with reference to FIG. 2, each of the memory systems 100 can include a plurality of memory devices (not shown in FIG. 1), such as dynamic random-access memory (DRAM) devices or one or more other types of memory devices. Each of the memory systems 100 further includes a respective SPD hub 106 (identified individually as SPD hubs 106a-106h in FIG. 1) that is used (a) for communication between the host device 108 and various components of the corresponding memory system 100, and (b) to store and communicate SPD information relating to the corresponding memory system 100. Examples of SPD information that can be stored in the SPD hubs 106 include module size, data width, data speed, timing specifications, operating conditions, failure information, and the like. Although illustrated with eight memory systems 100 in FIG. 1, the system 190 can include a greater or lesser number of memory systems 100 in other embodiments of the present technology.

The host device 108 can include one or more electronic devices that are capable of utilizing memory for temporary or persistent storage of information, or a component thereof. As a specific example, the host device 108 can include a memory controller. As another example, the host device 108 can include a computing device, such as a desktop or portable computer, a server, a hand-held device (e.g., a mobile phone, a tablet, a digital reader, a digital media player), or some component thereof (e.g., a central processing unit, a graphic processing unit, a co-processor, a dedicated memory controller, etc.). Additionally, or alternatively, the host device 108 can include a networking device (e.g., a switch, a router, etc.); a recorder of digital images, audio, and/or video; a vehicle; an appliance; a toy; or any one of a number of other products.

In the illustrated example, the host device 108 includes a memory 106 configured to store various processes, logic flows, and routines for controlling operation of the system 190, including managing the memory systems 100 and handling communications between the memory systems 100 and the host device 108. In some embodiments, the memory 106 can include memory registers storing, for example, memory pointers, fetched data, etc. The memory 106 can also include read-only memory (ROM) or other non-volatile memory, and/or volatile memory (e.g., SRAM). In these and other embodiments, the memory 106 can include firmware, such as a basic input/output system (BIOS) usable, for example, during startup to initialize the system 190 and/or the memory systems 100 (e.g., using SPD information stored in the SPD hubs 106). Although shown embedded in the host device 108 in FIG. 1, the memory 106 can be positioned at other locations in the system 190, such as exterior the host device 108 and/or exterior one or more of the memory systems 100a-100h.

In the illustrated embodiment, the host device 108 is connected to the memory systems 100 via a channel or bus 103. The channel 103 of FIG. 1 can facilitate communication of information (e.g., SPD information, commands/instructions, clock signals, etc.) between the memory systems 100 and the host device 108. In some embodiments, the channel 103 can be or can include a side channel of the system 190 and/or of the individual memory systems 100. As a specific example, the channel 103 can be or include an I2C or I3C® bus over which communications are transmitted and received, for example, in accordance with MIPI protocols (e.g., MIPI I2C or I3C® protocols). Thus, continuing with this example, the memory systems 100 and the host device 108 can each include an I2C or I3C® interface (not shown) coupled to the channel 103.

The channel 103 of FIG. 1 includes (a) clock traces configured to transmit host clock signals HSCL to the SPD hubs 106, and (b) serial data input/output (I/O) lines that are configured to serially transmit host sideband bus data HSDA to and from the SPD hubs 106. The host clock signals HSCL can be used to strobe data into and/or out of the SPD hubs 106 of the memory systems 100 via the serial data I/O lines.

The channel 103 can further include traces that are each configured to supply a host address signal HSA to a respective one of the memory systems 100. The host address signals HSA can be used to distinguish between identical devices (e.g., in the I3C® address range). For example, as shown in FIG. 1, the traces that supply the host address signals HSA to the memory systems 100 each couple the respective memory system 100 to a respective one of a plurality of resistors 104 (identified individually in FIG. 1 as resistors 104 *a*-104 *h*) on a motherboard (not shown) to which the memory systems 100 and/or the host device 108 are mounted. The resistors 104 can have different resistance values from one another. Thus, the HSA signals supplied to the memory systems 100 can be different from one another, and each HSA signal can be used as a unique identifier (e.g., to inform the corresponding memory system 100 into which slot on the motherboard the memory system 100 is positioned, to enable the host device 108 to specifically identify one or more of the SPD hubs 106 from communications, etc.).

Apart from the channel 103, the host device 108 or another host device (not shown) of the system 190 can be connected to the memory systems 100 via one or more other channels or buses. For example, as discussed in greater detail below with reference to FIG. 2, the host device 108 or another host device of the system 190 can be connected to the memory systems 100 via a command/address bus (not shown in FIG. 1) and a data (DQ) bus (not shown in FIG. 1). Additionally, or alternatively, the host device 108 or another host device of the system 190 may be indirectly connected to one or more of the memory systems 100 (e.g., over a networked connection or through intermediary devices, such as through a memory controller).

Figure 2:
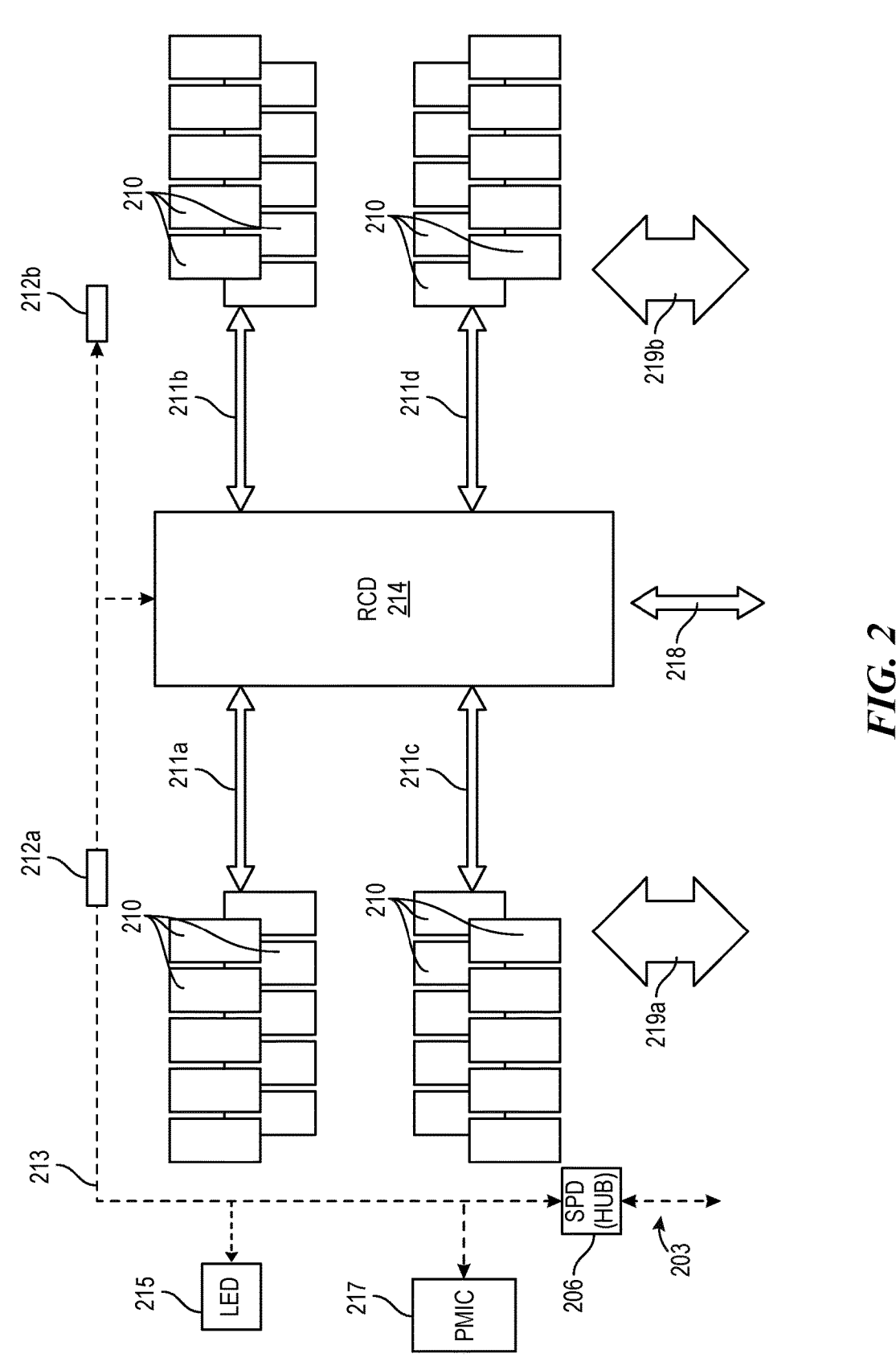
FIG. 2 is a block diagram schematically illustrating a memory system configured in accordance with various embodiments of the present technology.

FIG. 2 is a block diagram schematically illustrating a memory system 200 configured in accordance with various embodiments of the present technology. The memory system 200 can be one of the memory systems 100 of FIG. 1, or another memory system of the present technology. As shown, the memory system 200 includes a plurality of memory devices 210, a registered clock driver (RCD) 214, a plurality of temperature sensors 212 (identified individually in FIG. 2 as temperature sensors 212*a* and 212*b*), an SPD hub 206, an LED device 215, and a power management integrated circuit (PMIC) 217 that is used for regulating power on or supplied to various electronic devices of the memory system 200. Other well-known components of the memory system 200 have been omitted from FIG. 2 and are not described in detail below so as to avoid unnecessarily obscuring aspects of the present technology. In some embodiments, the memory system 200 can be a DIMM (e.g., a registered DIMM (RDIMM), a mini RDIMM, a fully buffered DIMM (FB-DIMM), an unbuffered DIMM (UDIMM), a load-reduced DIMM (LRDIMM), a non-volatile DIMM (NVDIMM), a small outline DIMM (SODIMM), a MicroDIMM, a single in-line memory module (SIMM), or another type of memory system.

The memory devices 210 of the memory system 200 can be memory dies, memory chips, memory packages, or the like. In some embodiments, the memory devices 210 can include DRAM memory devices (e.g., double data rate fifth-generation (DDR5) synchronous DRAM (SDRAM) devices, or other types or generations of DRAM devices). In these and other embodiments, the memory devices 210 can include other types of volatile or nonvolatile memory devices. Each of the memory devices 210 can include a plurality of memory cells (not shown) that can be used for temporary or persistent storage of information ("data"). The memory devices 210 can be mounted to one or more sides of a substrate (not shown) of the memory system 200, and/or can be arranged in ranks and/or rows (e.g., top row, bottom row) on the substrate. Although illustrated with a certain number of memory devices 210 in FIG. 2, the memory system 200 can include a greater or lesser number of memory devices 210 in other embodiments of the present technology.

As shown, each of the memory devices 210 of the memory system 200 can be coupled to a host device (e.g., the host device 108 of FIG. 1 or another host device, such as another host device of the system 190 of FIG. 1) via a data (DQ) channel 219. In the illustrated embodiment, the data DQ channel 219 includes a first data DQ sub-channel 219*a* that can be used, for example, to couple the memory devices 210 on the left of the RCD 214 in FIG. 2 to a host device (not shown), and a second data DQ sub-channel 219*b* that can be used, for example, to couple the memory devices 210 on the right of the RCD 214 in FIG. 2 to a host device. The data DQ channel 219 can be used to receive data signals from and to transmit data signals to a connected host device during memory access operations (e.g., reads or writes).

Each of the memory devices 210 is also coupled to the RCD 214 via corresponding buses 211 (identified individually in FIG. 2 as buses 211*a*-211*d*). Each of the buses 211 can include command/address buses, chip select traces, clock traces, error reporting traces, and the like that are usable to transmit control signals to the memory devices 210 and/or to report failures to the RCD 214. More specifically, the RCD 214 can be coupled to a host device (e.g., the host device 108 of FIG. 1 or another host device, such as another host device of the system 190 of FIG. 1) via a command/address bus 218. As the RCD 214 receives command/address signals via the command/address bus 218, the RCD 214 can generate and transmit memory command/address signals to the memory devices 210 via corresponding ones of the buses 211. In other words, the RCD 214 can buffer control signals sent to the memory devices 210 from a host device via the command/address bus 218, and then redrive the control signals as memory command/address signals to the memory devices 210 via the buses 211. The RCD 214 may also report failures (e.g., received from one or more of the memory devices 210) to the SPD hub 206 and/or to a host device connected to the SPD hub 206. Use of the RCD 214 can present a predictable electrical load (e.g., for matching impedance, reactance, capacitance, etc.) to the host device, which can enable use of higher memory densities and can increase signal integrity.

The memory system 200 further includes a side bus or channel 203 and a local sideband bus 213. In some embodiments, the local sideband bus 213 can be a local extension of the side channel 203. In the illustrated embodiment, the RCD 214, the temperature sensors 212, the PMIC 217, and the LED device 215 are each coupled to the SPD hub 206 via the local sideband bus 213, and the SPD hub 106 can be coupled to a host device (e.g., the host device 108 of FIG. 1 or another host device, such as another host device of the system 190 of FIG. 1) via the side channel 203. In some embodiments, one or more of the memory devices 100 may also be coupled to the host device via the side channel 203.

The side channel 203 and/or the local sideband bus 213 can be used for communications between various ones of the memory devices 100, the RCD 214, the temperature sensors 212, the PMIC 217, the LED device 215, the SPD hub 206, and/or a connected host device. For example, a connected host device can communicate with one or more of the memory devices 100, the RCD 214, the temperature sensors 212, the PMIC 217, and/or the LED device 215 via the side channel 203, the SPD hub 206, and/or the local sideband bus 213. Additionally, or alternatively, one or more of the memory devices 100, the RCD 214, the temperature sensors 212, the PMIC 217, and/or the LED device 215 can communicate with a connected host device via the local sideband bus 213, the SPD hub 206, and the side channel 213.

Although configured in the illustrated embodiment to communicate with a connected host device via the SPD hub 206, the LED device 215 can be configured to communicate directly with a connected host device in other embodiments of the present technology. For example, the LED device 215 can be directly coupled to one or more external pins of the memory system 200 usable to communicate directly with a connected host device. In these and other embodiments, the LED device 215 can be coupled (e.g., directly) to the side channel 203 to facilitate (e.g., direct) communications between two or more of the LED device 215, the SPD hub 206, and a connected host device. For example, the SPD hub 206 and the LED device 215 can be coupled to a common node along the side channel 203 such that the LED device 215 can communicate directly with a connected host device along the side channel 203 and/or directly with the SPD hub 206 along the side channel 203.

In some embodiments, the side channel 203 includes an I2C or I3C® bus. In these embodiments, the side channel 203 can include a clock trace and a serial data I/O line configured to transmit a host clock signal HSCL and host sideband bus data HSDA, respectively, between the SPD hub 206 and a connected host device. The side channel 203 may also include a trace configured to supply a host address signal HSA to the SPD hub 206. In some embodiments, the side channel 203 can be connected directly to one or more of the memory devices 100. In these embodiments, the side channel 203 can be configured to transmit a host clock signal HSCL, host sideband bus data HSDA, and/or a host address signal HSA between (e.g., directly between) the host device and the one or more memory devices 100.

Similarly, the local sideband bus can include one or more local clock traces and one or more local serial data I/O lines to transmit a local clock signal LSCL and local sideband bus data LSDA, respectively, between (i) the SPD hub 206 and (ii) the PMIC 217, the LED device 215, the temperature sensor 212a, the temperature sensor 212b, and/or the RCD 214. In addition, the local sideband bus 213 can include one or more traces configured to transmit address select signals SA to the PMIC 217, the LED device 215, the temperature sensor 212a, the temperature sensor 212b, and/or the RCD 214. In some embodiments, the address select signals SA can be used by a host device and/or by the SPD hub 206 to communicate with a specific device (e.g., one of the LED device 215, the PMIC 217, the temperature sensor 212a, the temperature sensor 212b, and/or the RCD 214) coupled to the local sideband bus 213.

The temperature sensors 212 can be integrated circuits configured to capture temperature measurements and/or monitor thermal changes in the memory system 200 over time. In some embodiments, the temperature sensors 212 are each positioned on the substrate (not shown) of the memory system 200 such that they are physically spaced out from one another. Spacing the temperature sensors 212 from one another can better capture a complete thermal profile of the memory system 200 across the substrate. In some embodiments, temperature information gathered by the temperature sensors 212 can be monitored (e.g., by the temperature sensors 212, by the SPD hub 206, and/or by a host device), and various operating conditions (e.g., fan speed) can be adjusted based at least in part on the temperature information to, for example, ensure that the temperature profile of the memory system 200 is correctly maintained.

Figure 3:
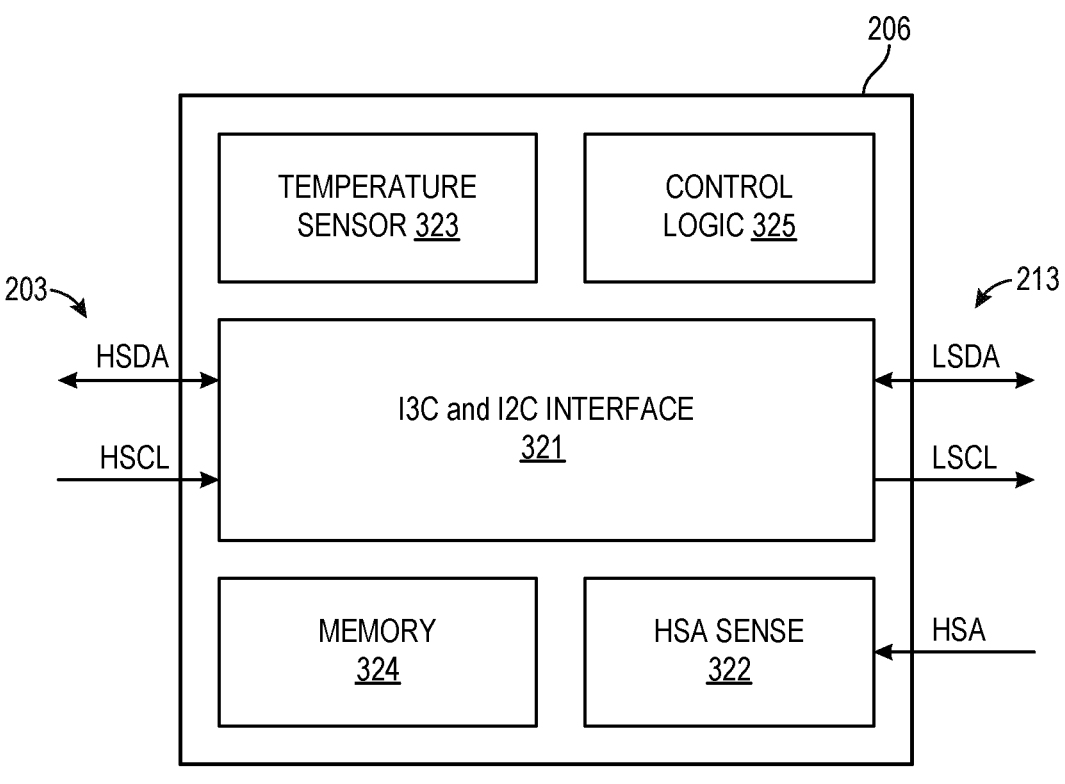
FIG. 3 is a block diagram schematically illustrating a serial presence detect (SPD) hub configured in accordance with various embodiments of the present technology.

As discussed above, communications over the side channel 203 and the local sideband bus 213 in the illustrated embodiments occur via the SPD hub 206. FIG. 3 is a block diagram schematically illustrating one example of the SPD hub 206 configured in accordance with various embodiments of the present technology. As shown, the SPD hub 206 includes an I2C/I3C® interface 321, HSA sense circuitry 322, an integrated temperature sensor 323, a memory 324, and control logic 325. Other well-known components of the SPD hub 206 (e.g., low dropout (LDO) linear voltage regulators) have been omitted from FIG. 3 and are not described in detail below so as to avoid unnecessarily obscuring aspects of the present technology.

As shown in FIG. 3, host clock signals HSCL and host sideband bus data HSDA transmitted to the SPD hub 206 (e.g., over the side channel 203 of FIG. 2) are received at the interface 321. Thereafter, the host clock signals HSCL and the host sideband bus data HSDA can be (a) translated by the SPD hub 206 into local clock signals LSCL and local sideband bus data LSDA, respectively, and (b) transmitted to the PMIC 217, the LED device 215, the temperature sensor 212a, the temperature sensor 212b, and/or the RCD 214 via the local sideband bus 213. Similarly, local sideband bus data LSDA can be (a) received at the interface 321 of the SPD hub 206 over the local sideband bus 213 (e.g., from the PMIC 217, the LED device 215, the temperature sensor 212a, the temperature sensor 212b, and/or the RCD 214), (b) translated by the SPD hub 206 into host sideband bus data HSDA, and (c) transmitted to a host device connected to the SPD hub 206 via the side channel 213. As discussed in greater detail below, host sideband bus data HSDA and/or local sideband bus data HSDA received at the interface 321 of the SPD hub 206 can additionally, or alternatively, be used to program bytes of the memory 324 with SPD information.

The HSA sense circuitry 322 of the SPD hub 206 can determine an address of the SPD hub 206 dependent on an HSA signal received at the SPD hub 206. As discussed above, the HSA signal can be unique, and can be sampled and used by the SPD hub 206 to determine various address-related information, such as into which slot of a motherboard the memory system 200 (FIG. 2) has been installed. A host device connected to the SPD hub 206 via the side channel 213 can leverage the unique HSA signal to specifically identify the SPD hub 206 for communications.

The temperature sensor 323 of the SPD hub 206 can capture temperature measurements at a location of the SPD hub 206 on the substrate of the memory system 200 (FIG. 2). Temperature measurements captured by the temperature sensor 323 can be monitored (e.g., by the SPD hub 206 and/or by a host device connected to the SPD hub 206 via the side channel 203) over time, and can be used to adjust various operating conditions (e.g., fan speed) to, for example, ensure that the temperature profile of the memory system 200 is correctly maintained. Temperature measurements captured by the temperature sensor 323 can be used (e.g., in addition to the temperature sensors 212 of FIG. 2)

to capture a more complete thermal profile of the memory system 200 across the substrate.

The memory 324 of the SPD hub 206 can be an electrically erasable programmable memory (EEPROM) or another type of memory. The memory 324 can be used to store SPD information related to the memory system 200. More specifically, the memory 324 in some embodiments can include a set amount of memory that is sectioned into well-defined (e.g., standardized) bytes of information. For example, the memory 324 can include 1024 or another number of bytes, and each byte can correspond to a specific type of SPD information. Of these, select bytes of the memory 324 can be reserved for storing information related to failures that occur in or on the memory system 200 (FIG. 2). Examples of SPD failure information include an indication that a memory device 210 (FIG. 2) of the memory system 200 failed to power on properly, or an indication of the occurrence of a correctable or uncorrectable error on a memory device 210. The indication of the occurrence of a correctable or uncorrectable error can include all or a subset of the following information: a bank address, a row address, a column address, a DQS byte, a CPU identifier, and/or a card identifier (CID). Additional details on the information that can be included in error logging data stored to bytes of the memory 324 can be found in Joint Electron Device Engineering Council (JEDEC®) specification JESD400-5 titled "DDR5 Serial Presence Detect (SPD) Contents" (e.g., on page 103). JEDEC® specification JESD400-5 is incorporated herein by reference in its entirety. Examples of other SPD information that can be stored in specific bytes of the memory 324 include module size, data width, data speed, timing specification, operating conditions, and the like.

Some SPD information stored to the memory 324 can be programmed to the memory 324 during assembly, manufacture, and/or test of the SPD hub 206 and/or of the memory system 200 (FIG. 2). Other SPD information stored to the memory 324 of the SPD hub 206 can be based at least in part on local sideband bus data LSDA, host sideband bus data HSDA, and/or an HSA signal received at the SPD hub 206. For example, information (e.g., occurrence, location, and/or type) of failures reported to the SPD hub 206 and/or to a connected host device during the life of the memory system 200 can be stored to corresponding SPD bytes of the memory 324.

SPD information stored in the memory 324 can be read out to a basic input/output system (BIOS) at boot or startup. In turn, the SPD information can be used to initialize or set operating conditions of the memory system 200 (FIG. 2) and/or of another system (e.g., the system 190 of FIG. 1) incorporating the memory system 200. As discussed in greater detail below, a host device or the SPD hub 206 may also instruct the LED device 215 to activate an LED based at least in part on SPD failure information stored to and/or read out from the memory 324.

The control logic 325 of the SPD hub 206 can be used to perform various operations. For example, the control logic 325 can be used to monitor temperature measurements captured by the temperature sensor 323 and/or to write SPD bytes to the memory 324 (e.g., based on local sideband bus data LSDA and/or host sideband bus data HSDA received at the SPD hub 206, and/or on temperature measurements captured by the temperature sensor 323). In some embodiments, the control logic 325 is reactive. In these embodiments, the control logic 325 can perform operations in response to instructions received from a connected host device via the side channel 203 and/or in response to SPD information received as local sideband bus data LSDA over the local sideband bus 213. For example, the control logic 325 can write SPD information to SPD bytes of the memory 324 in response to instructions received from a connected host device and/or in response to receiving failure information (e.g., from the RCD 214 (FIG. 2)).

In these and other embodiments, the control logic 325 can be proactive. For example, the control logic 325 can actively monitor temperature measurements captured by the temperature sensor 323 and/or one or more SPD bytes of the memory 324. As a specific example, the control logic 325 can monitor SPD bytes of the memory 324 that are reserved for SPD information related to failures that occur on the memory system 200 (FIG. 2). When SPD information is written to the reserved bytes, the control logic 325 may initiate transmitting an alert to a connected host device (e.g., a host device connected to the SPD hub 206 via the side channel 203 or another host device, such as another host device connected to an external pin of the memory system 200) indicating that the reserved SPD bytes have been written, and/or may instruct the LED device 215 to activate an LED. The alert can be an indication that the reserved SPD bytes have been written with failure information, or the alert can be a read out of all or a subset of the failure information written to the reserved SPD bytes. As a specific example, the control logic 325 can alert a host device when SPD information relating to failures is written to the reserved SPD bytes, and the host device can thereafter instruct the SPD hub 206 to read out the SPD information based at least in part on the alert. Additionally, or alternatively, the control logic 325 can (a) analyze the SPD information written to the reserved bytes of the memory 324 to, for example, determine a location or type of failure that occurred on the memory system 200, and/or (b) instruct the LED device 215 to activate an LED in a manner that communicates results of the analysis (e.g., the location and/or type of the error or failure). In these embodiments, the SPD information may or may not be first read out to a host device via the side channel 203.

Figure 4:
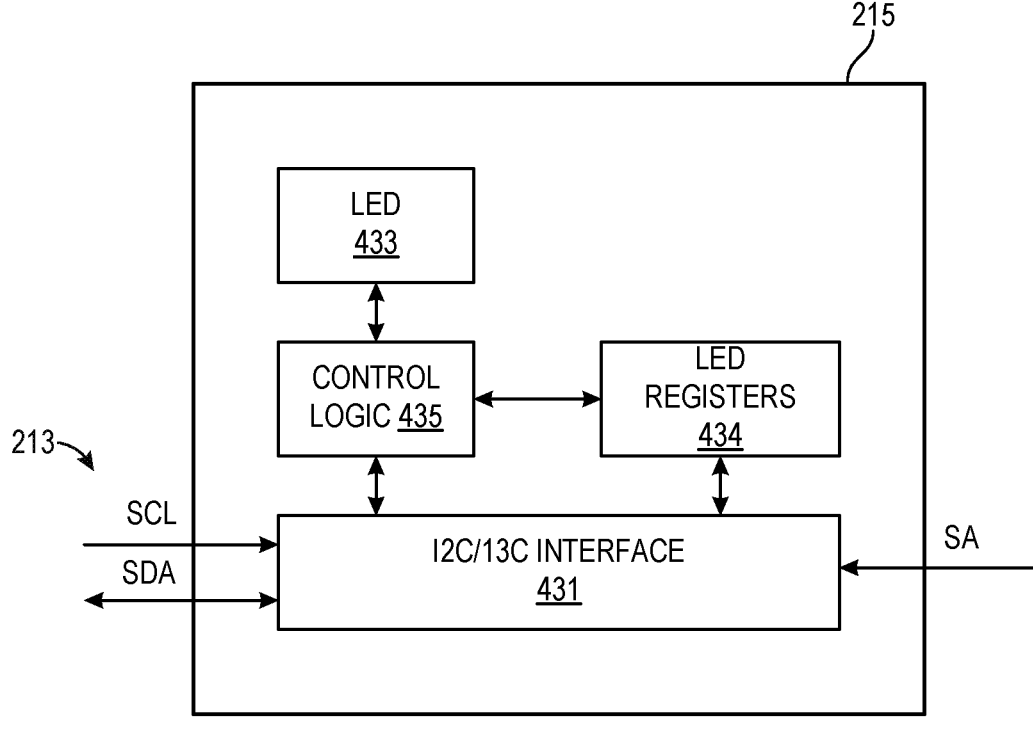
FIG. 4 is a block diagram schematically illustrating a light emitting diode (LED) device configured in accordance with various embodiments of the present technology.

Referring now to the LED device 215 of the memory system 200 of FIG. 2, the LED device 215 can be configured to provide a visual indication that a failure has occurred on the memory system 200. FIG. 4 is a block diagram schematically illustrating one example of the LED device 215 configured in accordance with various embodiments of the present technology. As shown, the LED device 215 includes an I2C/I3C® interface 431, an LED 433 or another light source, registers 434, and control logic 435.

As shown in FIG. 4, clock signals SCL and data signals SDA transmitted to the LED device 215 are received at the interface 431. In the embodiment illustrated in FIG. 2, the clock signals SCL and the data signals SDA can be local clock signals LSCL and local data signals SDA, respectively, that are transmitted to the LED device 215 from the SPD hub 206 (FIGS. 2 and 3) via the local sideband bus 213. In some embodiments, the LED device 215 may also transmit local data signals SDA to the SPD hub 206 via the interface 431 and the local sideband bus 213.

In other embodiments in which the LED device 215 is (e.g., directly) coupled to a host device and/or to the side channel 203, the clock signals SCL and the data signals SDA can be host clock signals HSCL and host data signals HSDA, respectively. The host clock signals HSCL and the host data signals HSDA can be transmitted to the interface 431 from a connected host device (e.g., the host device 108 of FIG. 1) and/or from the SPD hub 206, such as via the side channel 203 and/or an external terminal of the memory system 200 (FIG. 2) apart from the side channel 203. The LED device 215 may also transmit host data signals to a connected host device and/or the SPD hub 206 via the interface 431.

As shown, the interface 431 of the LED device 215 can additionally receive a select address signal SA. The select address signal SA can be unique to the LED device 215 (e.g., within the memory system 200 and/or within a system incorporating the memory system 200). Thus, the select address signal can be used by the SPD hub 206 and/or a connected host device to specifically identify the SPD hub 206 for communications.

The registers 434 of the LED device 215 can be used to store various information. For example, as discussed in greater detail below, the LED device 215 may receive instructions from the SPD hub 206 and/or a connected host device to activate an LED. The instructions can be received at the interface 431 as data signals SDA. In some embodiments, the instructions may command the LED device 215 to turn on the LED 433 of the LED device 215. In other embodiments, the instructions may command the LED device 215 to activate the LED 433 with particular color(s) or particular flashing code(s). Such instructions may be used to program one or more registers 434 of the LED device 215.

The control logic 435 of the LED device 215 can be used to (a) interpret data and/or instructions in data signals SDA received at the interface 431, (b) monitor the select address signal SA received at the interface 431, (c) transmit data in data signals SDA via the interface 431, (d) program one or more of the registers 434 with information (e.g., based on data signals SDA received at the interface 431), and/or (e) control activation of the LED 433 (e.g., based on information programmed into the registers 434). For example, the control logic 435 can monitor the select address signal SA received at the interface 431 to determine when the SPD hub 206 and/or a connected host device is communicating with the LED device 215. When the control logic 435 determines that the SPD hub 206 and/or the connected host device is communicating with the LED device 215, the control logic 435 can monitor data signals SDA received at the interface 431 for (i) commands/instructions and/or (ii) data to be written to the registers 434. In response to the commands/instructions and/or the data, the control logic 435 can program one or more of the registers 434, read data stored in the registers 434 out of the LED device 215 as data signals SDA via the interface 431, and/or activate the LED 433 (e.g., with a specific color, a specific series of colors, or in a specific flashing pattern).

The LED 433 is configured to emit light as a visual indication that a failure has occurred in or on the memory system 200 (FIG. 2). In some embodiments, the LED 433 can be single color LED or another type of light source. In other embodiments, the LED 433 can be multi-colored LED (e.g., a red, green, blue (RGB) LED) or another type of light source. In some embodiments, activation of the LED 433 can indicate that a failure has been detected and/or identified in or on the memory system 200 (FIG. 2). In these embodiments, the LED 433 can remain deactivated when a failure has not occurred or has not been detected/identified in or on the memory system 200. When activated, the LED 433 can be flashed in some embodiments (e.g., to communicate a type or location of a detected/identified failure).

In embodiments in which the LED 433 is a multi-color LED, the color of the light emitted from the LED 433 can be used to visually indicate an occurrence, a type, and/or a location of a failure. For example, the control logic 435 can activate the LED 433 such that the LED 433 emits green light to visually indicate that no failures have been detected/identified on the memory system 200 or that the memory system 200 is operating without issues. As another example, the control logic 435 can activate the LED 433 such that the LED 433 emits red light to visually indicate that an uncorrectable failure (e.g., an uncorrectable error) has occurred in or on the memory system 200. As still another example, the control logic 435 can activate the LED 433 such that the LED 433 emits yellow or blue light to visually indicate that a correctable failure (e.g., a correctable error) has occurred in or on the memory system 200. As yet another example, the control logic 435 can activate the LED 433 such that the LED 433 flashes in a specific pattern and/or with a specific color or series of colors to indicate a type of failure detected/identified in or on the memory system 200 and/or to indicate a location of where in or on the memory system 200 the failure occurred.

In some embodiments, operation of the LED 433 can be selectively enabled and disabled. For example, operation of the LED 433 can be selectively enabled or disabled (e.g., via a BIOS option, by a connected host device, by a system (e.g., the system 190 of FIG. 1) incorporating the memory system 200 (FIG. 2), by the corresponding memory system 200, etc.). The ability to selectively enable or disable functionality of the LED 433 can ensure that a memory system 200 equipped with an LED device 215 remains compatible with a system in which the memory system 200 is installed when the system does not support operation of the LED device 215. Additionally, or alternatively, the LED 433 can be selectively disabled to, for example, limit power consumption of the memory system 200 and/or conserve power.

Although shown with a single (e.g., only one) LED device having a single (e.g., only one) LED in FIGS. 2 and 4, the memory system 200 can include a greater (e.g., more than one) number of LED devices and/or a greater (e.g., more than one) number of LEDs per LED device in other embodiments of the present technology. For example, the memory system 200 and/or the LED device 215 can include an LED device and/or an LED per sub-channel of the data channel 219; can include an LED device and/or an LED per rank, row, or side of the substrate of the memory system 200; or can include an LED device and/or an LED per memory device 210 or group of memory devices 210. Including more LED devices and/or more LEDs on the memory system 200 can increase the speed with which a failing part is serviced and/or replaced by providing a system administrator more granularity into which component or group of components of the memory system 200 experienced a failure, thereby enabling the system administrator to more quickly identify a failing memory module (or a component thereof). As a specific example, in embodiments in which the memory system 200 and/or the LED device 215 includes an LED device and/or an LED per memory device 210, an LED device and/or an LED corresponding to a specific memory device 210 that experienced a failure can be activated while the other LED devices and/or LEDs of the memory system 200 remain deactivated. This can provide a visual indication to a system administrator of which specific memory device 210 of the memory system 200 experienced a failure (e.g., as opposed to an indication that generally informs a system administrator that a failure occurred somewhere on the memory system 200). As another example, the LED device 215 can include multiple LEDs 433 that can be activated in various combinations (e.g., various combinations of flashes and/or colors) to visually present a code to a system administrator that corresponds to a type and/or location of a failure detected/identified in or on the memory system 200.

Figure 5:
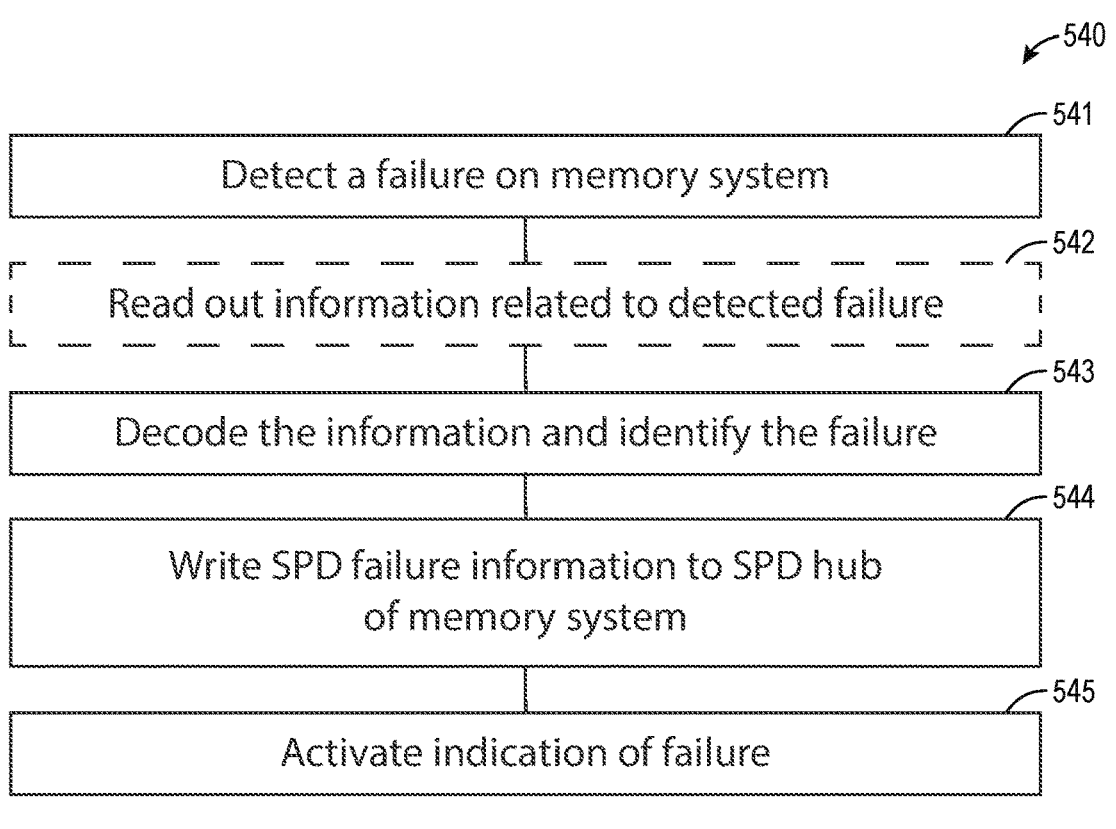
FIG. 5 is a flow diagram illustrating a method of operating a system in accordance with various embodiments of the present technology.

FIG. 5 is a flow diagram illustrating a method 540 of operating a system in accordance with various embodiments of the present technology. The method 540 is illustrated as a set of steps or blocks 541-545. All or a subset of one or more of the blocks 541-545 can be executed by components or devices of a system, such as the system 190 of FIG. 1 and/or the memory system 200 of FIG. 2. For example, all or a subset of one or more of the blocks 541-545 can be executed by (i) a host device, (ii) a memory system, (iii) an SPD hub, (iv) an LED device, (v) a temperature sensor, (vi) a PMIC, (vii) an RCD, (viii) a memory device, and/or (ix) other components of the system. Furthermore, all or a subset of one or more of the blocks 541-545 can be executed by a user or operator (e.g., a system administrator, technician, user, etc.) of one or more components of the system. Moreover, any one or more of the blocks 541-545 can be executed in accordance with the discussion of FIGS. 1-4 above.

The method 540 begins at block 541 by detecting a failure on a memory system. In some embodiments, a memory device of the memory system can detect the failure and/or report the failure to an RCD of the memory system. Continuing with this example, the RCD can report the failure to an SPD hub of the memory system, such as via a local sideband bus coupling the RCD to the SPD hub. As another example, the RCD, a temperature sensor, and/or the SPD hub can detect the failure. As still another example, a host device or BIOS connected to the memory system can detect the failure, such as when information that indicates a failure has occurred on the memory system is read out from the memory system to the connected host device or a BIOS.

At block 542, the method 540 optionally continues by reading out information related to the detected failure from the memory system. For example, when a failure is reported (e.g., when information relating to the failure is transmitted) to the SPD hub of the memory system, information related to the failure can be read out from the SPD hub to a connected host device. The information related to the failure can be read out at a timing or cadence specified by the host device. In these and other embodiments, the SPD hub can (e.g., proactively) alert the host device of the failure information. The alert can be an indication that the SPD hub has received failure information. In turn, the connected host device can read out the failure information in response to the alert received from the memory system. Alternatively, the alert can be a read of the failure information out of the memory system that is initiated by the SPD hub. The SPD hub can alert the host device via a side channel (e.g., an I2C or I3C® sideband bus) or via an external terminal coupled to the host device.

At block 543, the method 540 continues by decoding the failure information and identifying a corresponding failure of the memory system. In some embodiments, decoding the failure information and identifying the corresponding failure includes using system-level (e.g., BIOS-level) decoding software. In these and other embodiments, decoding the failure information includes identifying an occurrence (e.g., yes, failure occurred; or no, no failure detected), a type (e.g., a determination of a specific error/failure event, a determination of whether the error/failure is correctable or uncorrectable), and/or a location (e.g., a specific memory system, memory device, memory bank group, memory bank, memory row, memory cell, temperature sensor, RCD, PMIC, etc.) at which the error/failure occurred.

At block 544, the method 540 continues by writing SPD information to the SPD hub corresponding to the memory system in or on which the failure occurred. In some embodiments, writing the SPD information to the SPD hub includes writing the SPD information to reserved SPD bytes in memory of the SPD hub that are reserved for writing SPD information related to the failure. In these and other embodiments, writing the SPD information to the SPD hub includes sending the SPD information from a connected host device to the SPD hub via a side channel of the memory system.

At block 545, the method 540 continues by activating an indication of the failure. In some embodiments, the indication can be a visual indication. For example, the indication can be activation of an LED or another light source. Activation of the LED can include switching the LED from a first state to a second state. As a specific example, activation of the LED can include activating the LED such that it is switched from 'off' (not emitting light) to 'on' (emitting light). Alternatively, activation of the LED can include activating the LED such that it is switch from emitting light of a first color to emitting light of a second color. Additionally, or alternatively, activation of the LED can include controlling the LED to emit light of a certain color, to emit a select series of colors over time, and/or to emit flashes of light in a select pattern. The color, sequence of colors, flashing pattern, and/or specific LED activated from a plurality of LEDs can indicate an occurrence, type, and/or location of a failure on the memory system. In other embodiments, the indication can be deactivation of an LED that otherwise is turned on to emit light absent occurrence of a failure in or on the memory system. In still other embodiments, the indication can be non-visual, such as sending a signal (e.g., a voltage signal) to an external pin of the memory system to alert a connected host device of the failure on the memory system.

In some embodiments, activating the indication of the failure can include sending instructions to activate the indication of the failure. For example, a connected host device can send instructions (e.g., to the SPD hub or an LED device) to activate the indication. The connected host device can send the instructions before, after, or while writing the SPD information to the SPD hub. As another example, the SPD hub can send instructions (e.g., to the LED device) to activate the indication. The SPD hub can send the instructions in response to instructions received from a connected host device, in response to receipt of SPD information relating to the failure that occurred in or on the memory system, and/or in response to SPD information relating to the failure being written to reserved SPD bytes of the SPD hub. In embodiments in which the indication is a visual indication including activation of an LED, the instructions can include instructions to activate the LED with a specific color, a specific sequence of colors, a specific flashing pattern. The specific LED activated can additionally or alternatively be specified in the instruction. In other embodiments, an LED device of a memory system can activate the indication of the failure in response to the occurrence of specific events on the memory system. For example, the LED device can monitor the SPD hub and activate the LED when certain (e.g., reserved) SPD bytes relating to failures in or on the memory system are written in the SPD hub; or when the LED device receives information of the failure (e.g., from a connect host device, from the SPD hub, and/or via the side channel and/or a local sideband bus of the memory system).

Although the steps of the method 540 are discussed and illustrated in a particular order, the method 540 is not so limited. In other embodiments, the method 540 can be performed in a different order. In these and other embodiments, any of the steps 541-545 of the method 540 can be performed before, during, and/or after any of the other steps 541-545 of the method 540. Furthermore, the method 540 can be altered and still remain within these and other embodiments of the present technology. For example, one or more steps 541-545 of the method 540 can be omitted and/or repeated in some embodiments. As a specific example, the step 542 can be omitted in some embodiments. As another specific example, the method 540 can write SPD information to reserved SPD bytes of the SPD hub when a failure is detected at block 541. Continuing with this example, the SPD information can then be read out of the SPD hub to a connected host device or a BIOS at block 542; the connected host device or the BIOS can decode the SPD information and identify an occurrence, type, and/or location of a failure at block 543; and the host device or the BIOS can send instructions to the LED device and/or the SPD hub to activate the indication of the LED at block 545. In this example, block 544 can occur as a subset of block 541 of the method 540.

Figure 6:
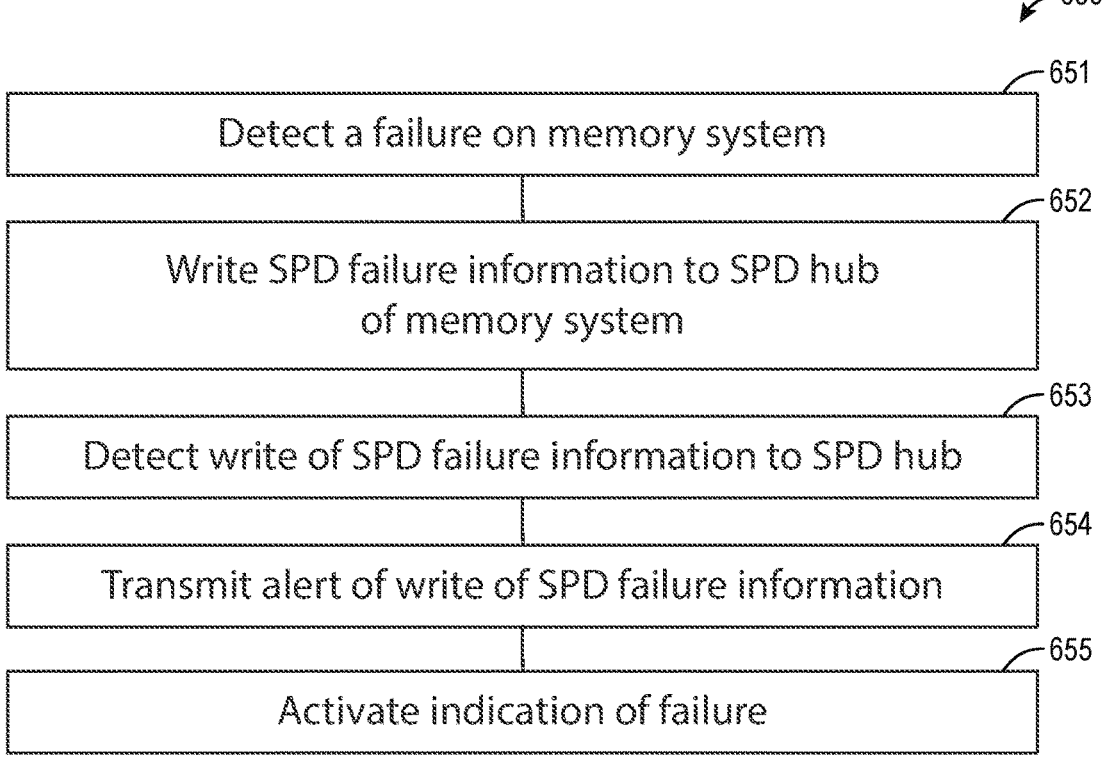
FIG. 6 is a flow diagram illustrating another method of operating a system in accordance with various embodiments of the present technology.

FIG. 6 is a flow diagram illustrating another method 650 of operating a system in accordance with various embodiments of the present technology. The method 650 is illustrated as a set of steps or blocks 651-655. All or a subset of one or more of the blocks 651-655 can be executed by components or devices of a system, such as the system 190 of FIG. 1 and/or the memory system 200 of FIG. 2. For example, all or a subset of one or more of the blocks 651-655 can be executed by (i) a host device, (ii) a memory system, (iii) an SPD hub, (iv) an LED device, (v) a temperature sensor, (vi) a PMIC, (vii) an RCD, (viii) a memory device, and/or (ix) other components of the system. Furthermore, all or a subset of one or more of the blocks 651-655 can be executed by a user or operator (e.g., a system administrator, technician, user, etc.) of one or more components of the system. Moreover, any one or more of the blocks 651-655 can be executed in accordance with the discussion of FIGS. 1-5 above.

The method 650 begins at block 651 by detecting a failure on a memory system. In some embodiments, a memory device, an RCD, a temperature sensor, and/or an SPD hub of the memory system can detect the failure. As still another example, a host device or BIOS connected to the memory system can detect the failure, such as when information that indicates a failure has occurred on the memory system is read out from the memory system to the connected host device or a BIOS.

At block 652, the method 650 continues by writing SPD information to the SPD hub corresponding to the memory system in or on which the failure occurred. In some embodiments, writing the SPD information to the SPD hub includes writing the SPD information to reserved SPD bytes in memory of the SPD hub that are reserved for writing SPD information related to the failure. In these and other embodiments, writing the SPD information to the SPD hub includes sending the SPD information from a connected host device to the SPD hub via a side channel of the memory system.

At block 653, the method 650 continues by detecting that SPD information related to a failure of the memory system has been written to the SPD hub. In some embodiments, detecting that the SPD information related to the failure has been written to the SPD hub includes detecting that SPD information has been written to specific SPD bytes of the SPD hub reserved for failure information. In these and other embodiments, detecting that SPD information related to a failure of the memory system has been written to the SPD hub includes analyzing SPD information stored to the SPD hub and determining that at least some of the SPD information stored to the SPD hub relates to a failure of the memory system. In these and still other embodiments, a connected host device, the SPD hub, and/or an LED device of the memory system can detect that SPD information related to a failure of the memory system has been written to the SPD hub.

At block 654, the method 650 continues by alerting that SPD information related to a failure of the memory system has been written to the SPD hub. In some embodiments, the SPD hub can (e.g., proactively) alert the host device and/or the LED device of the failure information. The alert can be an indication that SPD information related to a failure of the system has been written to the SPD hub. The connected host device can read out the SPD information related to the failure in response to an alert received from the memory system. Alternatively, the alert can be a read of the SPD failure information (e.g., out of the memory system and/or to the connected host device) that is initiated by the SPD hub. The SPD hub can alert the host device via a side channel (e.g., an I2C or I3C® sideband bus) or via an external terminal coupled to the host device.

In other embodiments, the alert can be instructions to activate an indication of the failure. For example, the SPD hub can alert the LED device of the SPD information by instructing the LED device to activate the LED (e.g., with a specific color, sequence of colors, a specific flashing pattern, etc.). In some embodiments, a connected host device can alert the SPD hub and/or the LED device of the SPD information (e.g., by instructing the SPD hub and/or the LED device to activate an indication of the failure).

At block 655, the method 650 continues by activating an indication of the failure. In some embodiments, activating the indication of the failure can be similar to activating the indication of the failure discussed above with respect to block 545 of the method 540 of FIG. 5. For example, the indication can be a visual indication, such as activation of an LED. Activation of the LED can include switching the LED from a first state to a second state. As a specific example, activation of the LED can include activating the LED such that it is switched from 'off' (not emitting light) to 'on' (emitting light). Alternatively, activation of the LED can include activating the LED such that it is switch from emitting light of a first color to emitting light of a second color. Additionally, or alternatively, activation of the LED can include controlling the LED to emit light of a certain color, to emit a select series of colors over time, and/or to emit flashes of light in a select pattern. The color, sequence of colors, flashing pattern, and/or specific LED activated from a plurality of LEDs can indicate an occurrence, type, and/or location of a failure on the memory system. In other embodiments, the indication can be deactivation of an LED that otherwise is turned on to emit light absent occurrence of a failure in or on the memory system. In still other embodiments, the indication can be non-visual, such as sending a signal (e.g., a voltage signal) to an external pin of the memory system to alert a connected host device of the failure on the memory system.

In some embodiments, an LED device of a memory system can activate the indication of the failure in response to the occurrence of specific events on the memory system. For example, the LED device can monitor the SPD hub and activate the LED when certain (e.g., reserved) SPD bytes relating to failures in or on the memory system are written in the SPD hub; or when the LED device receives information of the failure (e.g., from a connect host device, from the SPD hub, and/or via the side channel and/or a local sideband bus of the memory system). In these embodiments, block 654 of the method 650 can be omitted.

Although the steps of the method 650 are discussed and illustrated in a particular order, the method 650 is not so limited. In other embodiments, the method 650 can be performed in a different order. In these and other embodiments, any of the steps 651-655 of the method 650 can be performed before, during, and/or after any of the other steps 651-655 of the method 650. Furthermore, the method 650 can be altered and still remain within these and other embodiments of the present technology. For example, one or more steps 651-655 of the method 650 can be omitted and/or repeated in some embodiments.

In some embodiments, identifying the occurrence, type, and/or location of a failure can occur during any of the blocks 651-655 of the method 650. For example, the occurrence, type, and/or location of a failure can be determined at block 651 when the failure is initially detected. As another example, the occurrence, type, and/or location of a failure can be determined at blocks 651 or 652 when SPD information is written to SPD bytes of the SPD hub and/or when a write of the SPD bytes of the SPD hub is detected. As still another example, the occurrence, type, and/or location of a failure can be determined at blocks 654 or 655 while sending an alert that SPD information related to a failure has been written to the SPD hub and/or when activating the indication of the failure. In some embodiments, the indication of the failure can depend at least in part on the occurrence, type, and/or location of a failure. For example, when activating an LED, the color, sequence of colors, flashing pattern, activation, and/or specific LED activated can depend at least in part on the occurrence, type, and/or location of the failure.

Figure 7:
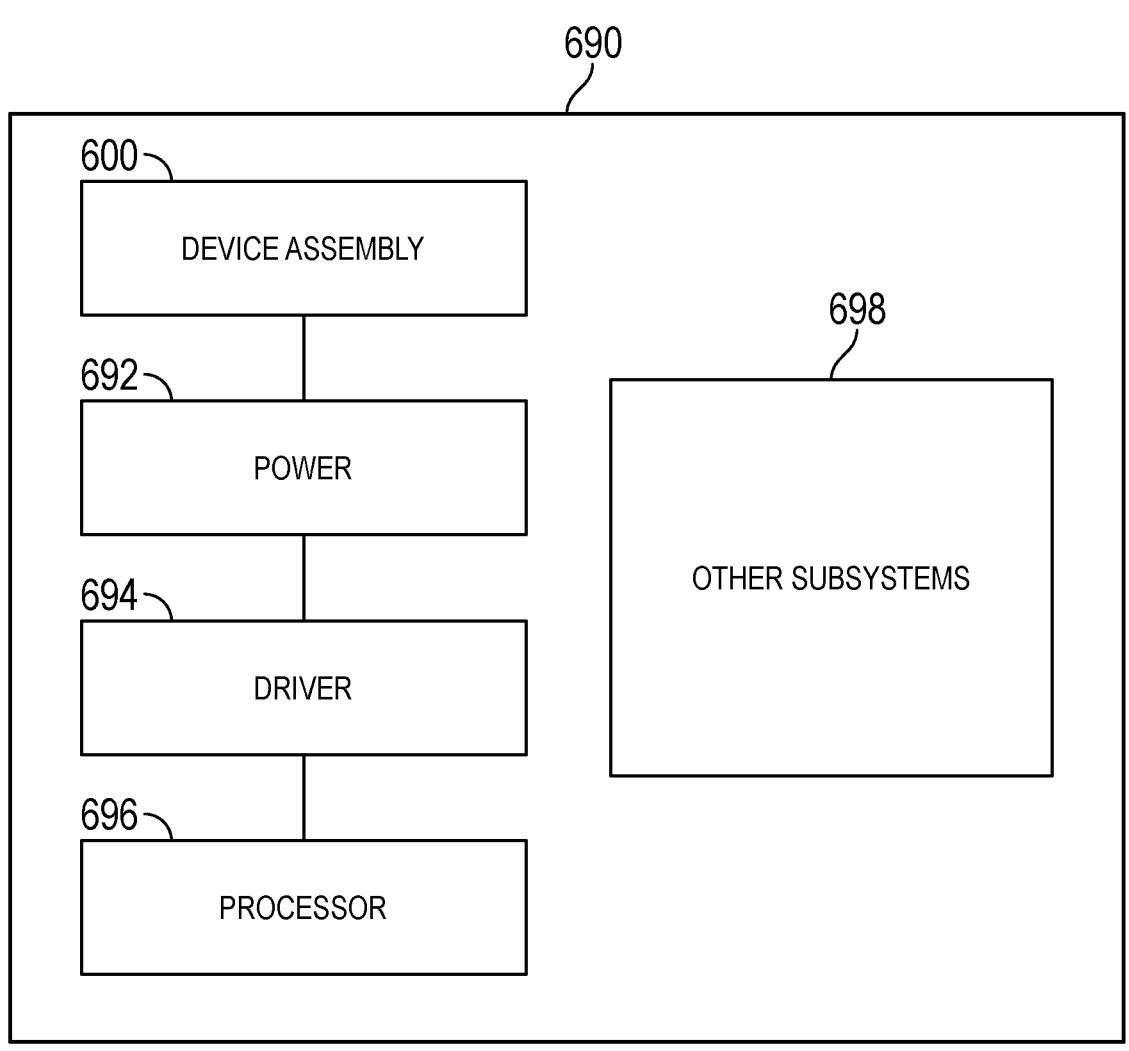
FIG. 7 is a block diagram of a system having a memory device configured in accordance with various embodiments of the present technology.

Any of the foregoing memory systems, devices, and/or methods described above with reference to FIGS. 1-6 can be incorporated into any of a myriad of larger and/or more complex systems, a representative example of which is system 790 shown schematically in FIG. 7. The system 790 can include a semiconductor device assembly 700, a power source 792, a driver 794, a processor 796, and/or other subsystems and components 798. The semiconductor device assembly 700 can include features generally similar to those of the memory systems, devices, and/or methods described above with reference to FIGS. 1-6. The resulting system 790 can perform any of a wide variety of functions, such as memory storage, data processing, and/or other suitable functions. Accordingly, representative systems 790 can include, without limitation, hand-held devices (e.g., mobile phones, tablets, digital readers, and digital audio players), computers, vehicles, appliances, and other products. Components of the system 790 may be housed in a single unit or distributed over multiple, interconnected units (e.g., through a communications network). The components of the system 790 can also include remote devices and any of a wide variety of computer readable media.

As used herein, the terms "memory system" and "memory device" refer to systems and devices configured to temporarily and/or permanently store information related to various electronic devices. Accordingly, the term "memory device" can refer to a single memory die and/or to a memory package containing one or more memory dies. Similarly, the term "memory system" can refer to a system including one or more memory dies (e.g., a memory package) and/or to a system (e.g., a dual in-line memory module (DIMM)) including one or more memory packages.

Where the context permits, singular or plural terms can also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded. Moreover, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; it will be understood by a person of ordinary skill in the art, however, that the signal may represent a bus of signals, where the bus may have a variety of bit widths.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein. To the extent any materials incorporated herein by reference conflict with the present disclosure, the present disclosure controls.

What is claimed is:

1. A system, comprising:
a plurality of dual in-line memory modules (DIMMs), each DIMM of the plurality including—
a registered clock driver (RCD),
a plurality of memory devices configured to communicate error information to the RCD via corresponding busses,
a fail indicator including a visual indicator,
a serial presence detect (SPD) hub, and
a local sideband bus coupling (a) the SPD hub to the RCD and (b) the SPD hub to the fail indicator independently of the RCD, wherein the RCD is configured to communicate the error information to the SPD hub via the local sideband bus; and
a host device connected to the SPD hub via a side channel of the system, wherein the host device is configured to:
receive, via the side channel, information from the SPD hub of a DIMM of the plurality of DIMMS,
based at least in part on the information, detect an occurrence of a failure on the DIMM, and
initiate activation of the visual indication of the fail indicator on the DIMM based at least in part on detection of the failure.

2. The system of claim 1, wherein the side channel includes an I3C® side channel.

3. The system of claim 1, wherein the fail indicator on each DIMM of the plurality of DIMMs is connected to the host device via the side channel, the respective SPD hub, and the respective local sideband bus.

4. The system of claim 1, wherein the visual indicator of each DIMM of the plurality of DIMMs includes a light emitting diode (LED), and wherein activation of the fail indicator on the DIMM includes activating the LED to emit light.

5. The system of claim 4, wherein a color of the light corresponds to a type, occurrence, or location of the failure on a DIMM of the plurality.

6. The system of claim 1, wherein the fail indicator on each DIMM of the plurality of DIMMs is dedicated to communicating failures corresponding to only that DIMM.

7. The system of claim 1, wherein the side channel includes an I2C side channel.

8. The system of claim 1, wherein the fail indicator of each DIMM of the plurality of DIMMs is directly coupled to the host device.

9. A method, comprising:
receiving, via a side channel of a system, information from a serial presence detect (SPD) hub of a memory system, wherein the system includes a plurality of memory systems including the memory system, wherein each memory system of the plurality of memory systems includes (i) a respective registered clock driver and (ii) a respective SPD hub that is connected to a host device via the side channel, wherein each memory system of the plurality of memory systems further includes a fail indicator that has a visual indicator and that is coupled to the respective SPD hub via a respective local sideband bus and independently of the respective registered clock driver, and wherein each fail indicator is coupled to the host device via the respective sideband bus, the respective SPD hub, and the side channel;

detecting, based at least in part on the information, that a failure has occurred on the memory system; and
initiating activation of the visual indicator of the fail indicator of the memory system based at least in part on the detection of the failure, wherein initiating the activation of the visual indicator includes causing the visual indicator to provide an indication of an occurrence of the failure on the memory system.

10. The method of claim 9, wherein receiving the information via the side channel includes receiving the information via an I3C® side channel.

11. The method of claim 9, wherein:
the visual indicator of each fail indicator includes a light emitting diode (LED) or another light source; and
activation of the visual indicator of the fail indicator of the memory system includes switching the LED or other light source from a first state to a second state.

12. The method of claim 11, wherein the second state includes the LED or other light source emitting a color corresponding to a type or location of the failure.

13. The method of claim 11, further comprising selectively enabling or selectively disabling functionality of the visual indicator via an option in a basic input/output system (BIOS) connected to the memory system.

14. The method of claim 9, wherein receiving the information via the side channel includes receiving the information via an I2C side channel.

15. The method of claim 9, further comprising writing SPD information related to the failure in SPD bytes of the SPD hub of the memory system.

16. The method of claim 9, wherein the fail indicator of the memory system includes a plurality of visual indicators including the visual indicator, wherein each visual indicator of the plurality of visual indicators is dedicated to a different location on the memory system, and wherein initiating activation of the visual indicator includes switching a specific one of the plurality of visual indicators from a first state to a second state, and the specific one of the plurality of visual indicators corresponds to a location of the failure on the memory system.

17. A memory system, comprising:
a plurality of memory devices, each configured to connect to a first host device via a data channel;
a serial presence detect (SPD) hub connected to a second host device via a side channel different from the data channel, and configured to provide an indication of detection of a failure on the memory system; and
a fail indicator coupled to the second host device (i) via the SPD hub and the side channel and (ii) separate from a registered clock driver, wherein the fail indicator is configured to, based at least in part on the indication of the detection of the failure, provide a visual indication of an occurrence of the failure on the memory system.

18. The memory system of claim 17, wherein the side channel includes an I3C® channel.

19. The memory system of claim 17, wherein:
the memory system includes a plurality of fail indicators including the fail indicator; and
each fail indicator of the plurality of fail indicators (a) is dedicated to a different subchannel of the data channel or to a different memory device of the plurality of memory devices and (b) is configured to provide a visual indication of an occurrence of a failure detected on a corresponding subchannel or a corresponding memory device of the plurality of memory devices.

20. The memory system of claim 17, wherein the memory system is a dual in-line memory module (DIMM), the plurality of memory devices includes a plurality of dynamic random-access memory (DRAM) devices, wherein the memory system further includes the registered clock driver, and wherein the registered clock driver is (a) connected to each memory device of the plurality of memory devices and (b) connected to the SPD hub via a local sideband bus.

\* \* \* \* \*